US008800181B2

(12) United States Patent
Versteeg

(10) Patent No.: US 8,800,181 B2
(45) Date of Patent: Aug. 12, 2014

(54) APPARATUS AND METHOD FOR BAGGAGE CHECK AND PROMOTIONAL ADVERTISEMENT

(75) Inventor: Freddy W. Versteeg, Salt Lake City, UT (US)

(73) Assignee: Freddy W. Versteeg, Salt Lake City, UT (US)

( * ) Notice: Subject to any disclaimer, the term of this patent is extended or adjusted under 35 U.S.C. 154(b) by 45 days.

(21) Appl. No.: 13/185,262

(22) Filed: Jul. 18, 2011

(65) Prior Publication Data

US 2012/0010895 A1 Jan. 12, 2012

Related U.S. Application Data

(63) Continuation-in-part of application No. 13/044,087, filed on Mar. 9, 2011, now Pat. No. 8,079,164, which is a continuation of application No. 12/069,183, filed on Feb. 6, 2008, now Pat. No. 7,926,210.

(60) Provisional application No. 60/899,775, filed on Feb. 6, 2007, provisional application No. 61/001,776, filed on Nov. 2, 2007.

(51) Int. Cl.
*G09F 3/20* (2006.01)

(52) U.S. Cl.
USPC ..................... 40/6; 40/675; 283/80

(58) Field of Classification Search
USPC ................. 40/675, 6, 633; 283/80
See application file for complete search history.

(56) References Cited

U.S. PATENT DOCUMENTS 4,700,976 A * 10/1987 Loose ........................ 283/101
5,381,617 A * 1/1995 Schwartztol et al. .......... 40/6
6,623,039 B2 * 9/2003 Thompson et al. .......... 283/61
6,898,880 B2 * 5/2005 Best et al. ................ 40/299.01
7,779,570 B2   8/2010 Riley
2003/0070338 A1 * 4/2003 Roshkoff .................... 40/638
2003/0104174 A1 * 6/2003 Itakura et al. .............. 428/195
2005/0081411 A1 * 4/2005 Becker ........................ 40/6
2009/0223099 A1   9/2009 Versteeg
2009/0309352 A1 * 12/2009 Walker et al. ............. 283/100
2010/0181755 A1 * 7/2010 Irwin et al. ............... 283/100

FOREIGN PATENT DOCUMENTS

JP    2010-256640 A    11/2010

OTHER PUBLICATIONS www.technicote.com; Technicote Product Data Sheet, Technicote IRC Film Base/AT333/40#SCK L-3, Item #62996; Jun. 6, 2011.
Sekisui TA Industries, LLC; Product Fact Sheet, 1194 Clear Polypropylene Overlaminate; www.sta-overlamination.com; Jul. 18, 2011.

* cited by examiner

*Primary Examiner* — Kristina Junge
(74) *Attorney, Agent, or Firm* — Steven L. Nichols; Van Colt, Bagley, Cornwall & McCarthy P.C.

(57) ABSTRACT

A luggage tag system includes a main portion comprising an elongated portion for forming a loop to attach the luggage tag system to a piece of luggage; a removable portion detachable from the main portion; a unique serial number provided on both the main portion and the removable portion; an area of the removable portion comprising a printed coupon or prize indicator; and an adhesive panel covering the area to prevent the area from being seen until the adhesive panel is removed. Any portion of the adhesive panel that is separated from the removable portion of the tag system loses its ability to adhere to the removable portion so that premature removal of the adhesive panel, in whole or in part, is detectable.

14 Claims, 10 Drawing Sheets

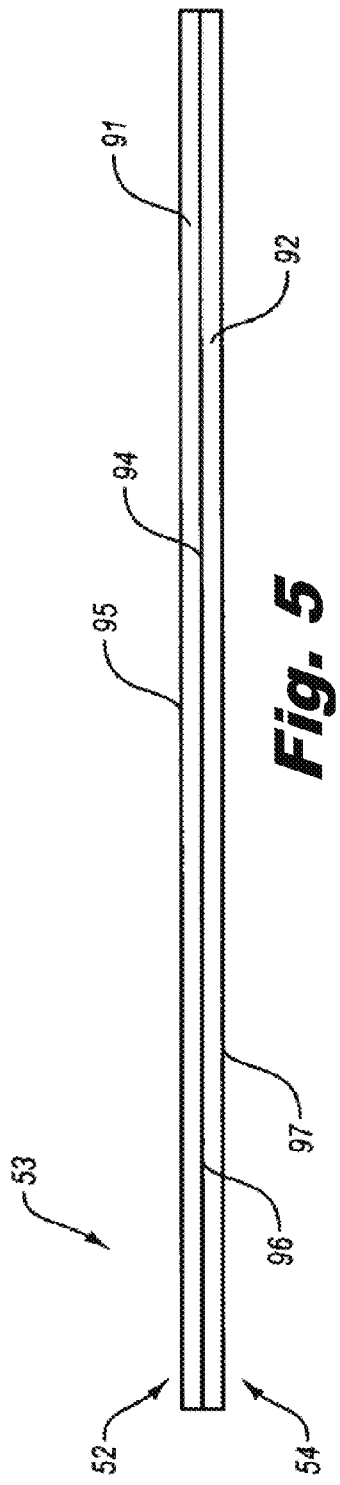
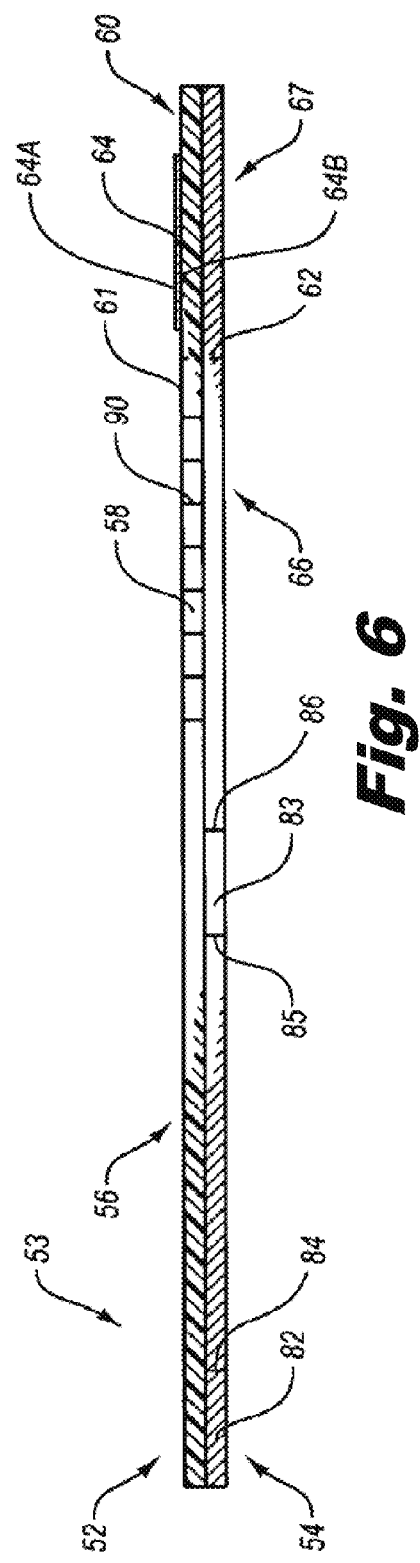

APPARATUS AND METHOD FOR BAGGAGE CHECK AND PROMOTIONAL ADVERTISEMENT

RELATED APPLICATIONS

The present application is a continuation-in-part of, and claims priority under 35 U.S.C. §120 from, previous U.S. patent application Ser. No. 13/044,087, filed Mar. 9, 2011, which is a continuation of and claims priority under 35 U.S.C. §120 from previous U.S. patent application Ser. No. 12/069,183, filed Feb. 6, 2008 and entitled "Apparatus and Method for baggage check and promotional advertisement," which previous application claimed the priority under 35 U.S.C. §119(e) of U.S. Provisional Patent Application No. 60/899,775, entitled "Apparatus and Method for a Baggage Check and Promotional Advertisement," filed Feb. 6, 2007, and to U.S. Provisional Application, entitled "Apparatus and Method for Baggage Check and Promotional Advertisement," filed Nov. 2, 2007, Ser. No. 61/001,776. All the previous applications listed above are hereby incorporated by reference in their respective entireties.

BACKGROUND

Hotels, casinos and the like go to various efforts to promote shows or restaurants or other forms of entertainment owned, produced or operated by the hotels or casinos or in partnership with other hotels or casinos or related organizations. Oftentimes, substantial amounts of money are expended toward these efforts with the ultimate goal being to coax or encourage consumers to a particular destination either within or nearby the hotel or casino. The present specification provides a means to accomplish this objective simply and inexpensively.

BRIEF DESCRIPTION OF THE DRAWINGS

The accompanying drawings illustrate various examples of the principles described herein and are a part of the specification. The illustrated examples are merely examples and do not limit the scope of the claims.

FIG. 5 depicts a cross sectional view of the two layer flexible vinyl substrate used in making the example illustrated in FIGS. 3 and 4;

FIG. 6 depicts a further cross sectional view of the two layer flexible vinyl substrate used in making the example illustrated in FIGS. 3 and 4 with the inclusion of kiss-cuts and scratch layer;

Throughout the drawings, identical reference numbers designate similar, but not necessarily identical, elements.

DETAILED DESCRIPTION

Figure 1:
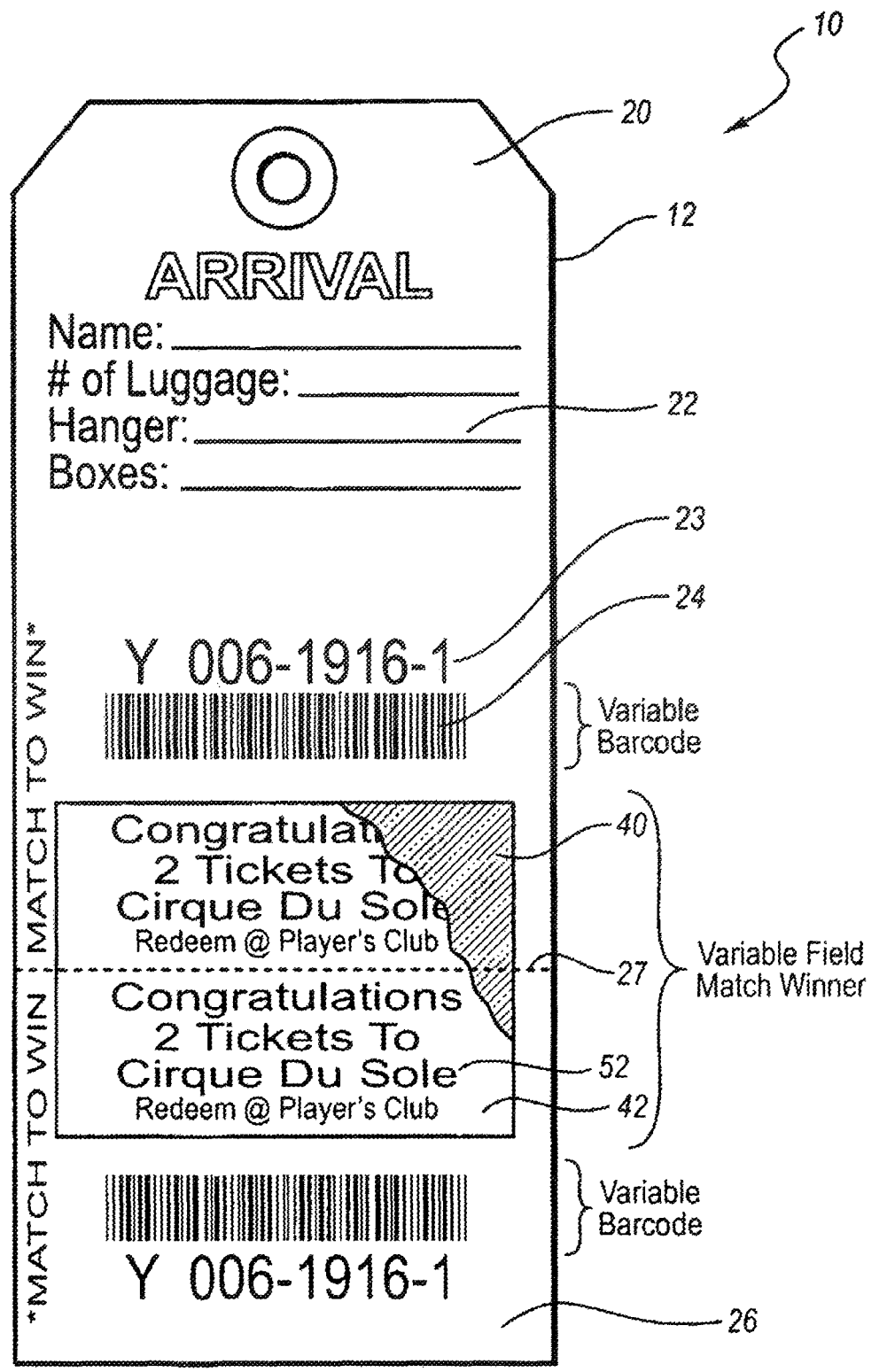
FIG. 1 depicts a first side of an example of a luggage tag system having luggage ownership identifying information or space therefore and scratch-surface panels for promotional advertising.
Figure 2:
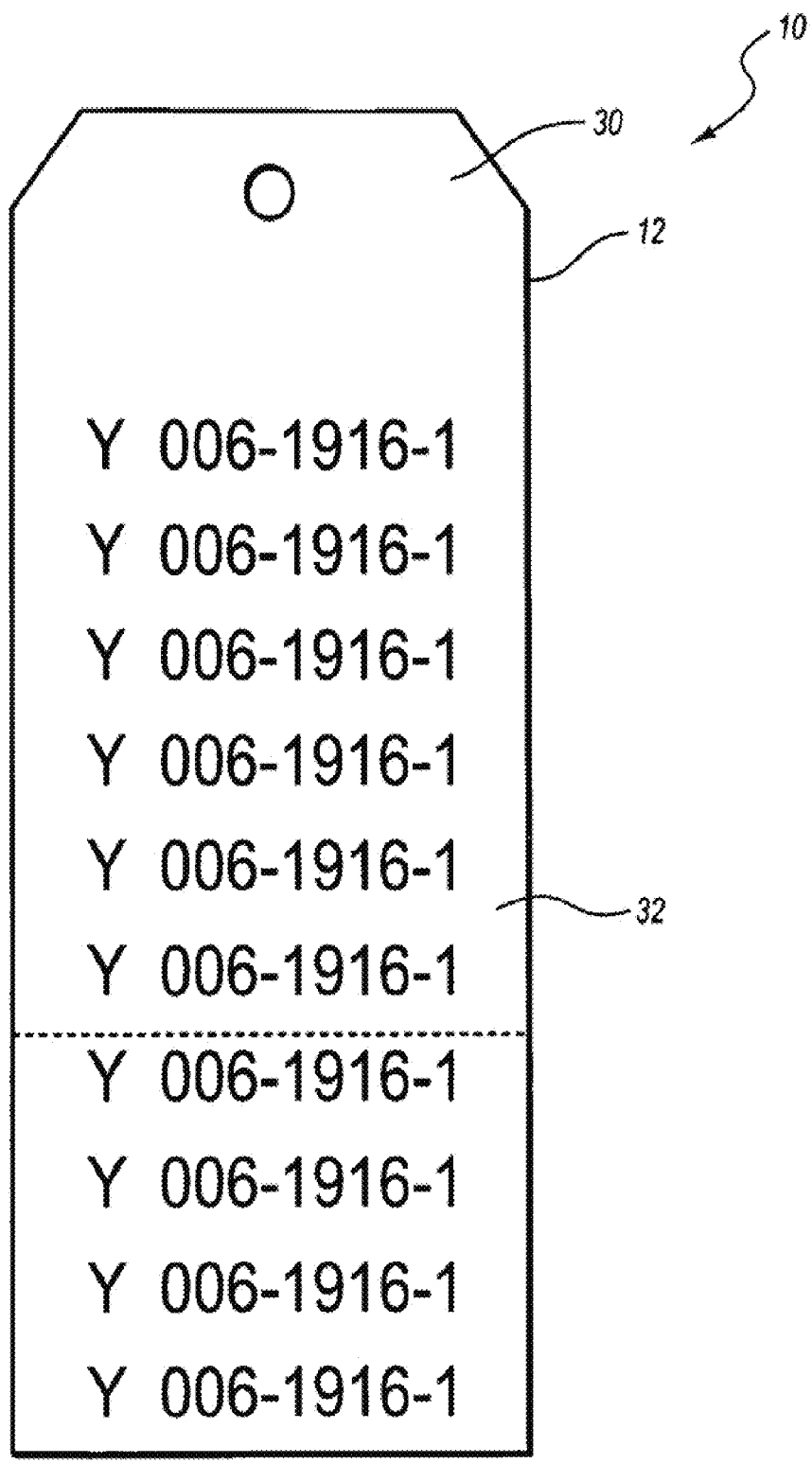
FIG. 2 depicts a second side of an example of a luggage tag system having further luggage ownership identifying information printed thereon.

This specification concerns apparatus and methods for use by hotels, casinos and the like to identify ownership of luggage and to provide promotional advertisement. Referring, for example, to FIGS. 1 and 2, a luggage tag 10 is illustrated. The luggage tag 10 includes a generally flat substrate 12 having a first surface 20 and a second surface 30. Generally speaking, the first surface 20 comprises a front side of the flat substrate 12 while the second surface 30 comprises a back or opposite side of the flat substrate 12. The flat substrate 12 of the luggage tag 10 can be constructed using any suitable material, such as, for example, plastic, paper, vinyl or cardboard, or a combination thereof.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an example" or similar language means that a particular feature, structure, or characteristic described is included in at least that one example, but not necessarily in other examples.

Referring particularly to FIG. 1, the first surface 20 includes a first portion 22 for printing ownership identifying information. The ownership identifying information includes generally the owner's name, the number of pieces of luggage and any additional information that is helpful in tracking or delivering the luggage—e.g., the room number of the owner while a guest at a hotel or casino. An identification serial number 23 and, if desired, a corresponding variable barcode 24, is printed on the luggage tag for further identifying purposes.

The first surface 20 further includes a second portion 26 that is removably connected to the first portion 22 through a perforated segment 27 allowing the first section 22 and second section 26 to be separated. A first scratch surface 40 is provided on the first portion 22 and a second scratch surface 42 is provided on the second portion 26. The first 40 and second 42 scratch surfaces cover printed information concerning a promotional advertisement, and serve to keep the information hidden prior to the scratch surfaces being scratched away by a user's fingernail or coin or the like. Referring to FIG. 2, the second surface 30 includes one or more identifying labels 32. The identifying labels 32 are preferably kiss-cut and removably attached to the second surface 30.

In one example, a method for identifying ownership of luggage and providing a promotional advertisement is disclosed. Specifically, upon arrival by a guest at a hotel or casino, a luggage tag 10 is obtained by a hotel or casino employee. Information concerning the name of the guest and the number of pieces of luggage is noted on the first portion 22 of the luggage tag 10, along with the room number or cell phone number or other pertinent identifying information. Luggage identifying labels 32 are then detached from the second surface 30 of the luggage tag 10 and removeably attached to the individual pieces of luggage, which are thereafter transported to the guest's room by a bellhop or other hotel or casino employee. The second portion 26 of the luggage tag is then separated from the first portion 22 by tearing along the perforated segment 27. The second portion 26 is provided to the guest and the first portion 22 is provided to the bellhop.

Following arrival and check-in of luggage, the guest may proceed to his or her room or where they might otherwise desire. At the same time or thereafter, the luggage is transported to the guest's room and the first portion 22 of the luggage tag 10 is left with the delivered luggage or at a suitable location where the guest may locate the first portion 22. The guest may then scratch away the first 40 and second 42 scratch-surface portions, thereby revealing or exposing first 50 and second 52 printed promotional materials previously blocked from view by the scratch-surfaces. In an example, if both the first 50 and second 52 printed promotional materials match, then the guest wins whatever is being advertised by the first 50 and second 52 printed promotional material—e.g., a ticket or tickets to a show or dinner at a restaurant.

Figure 3:
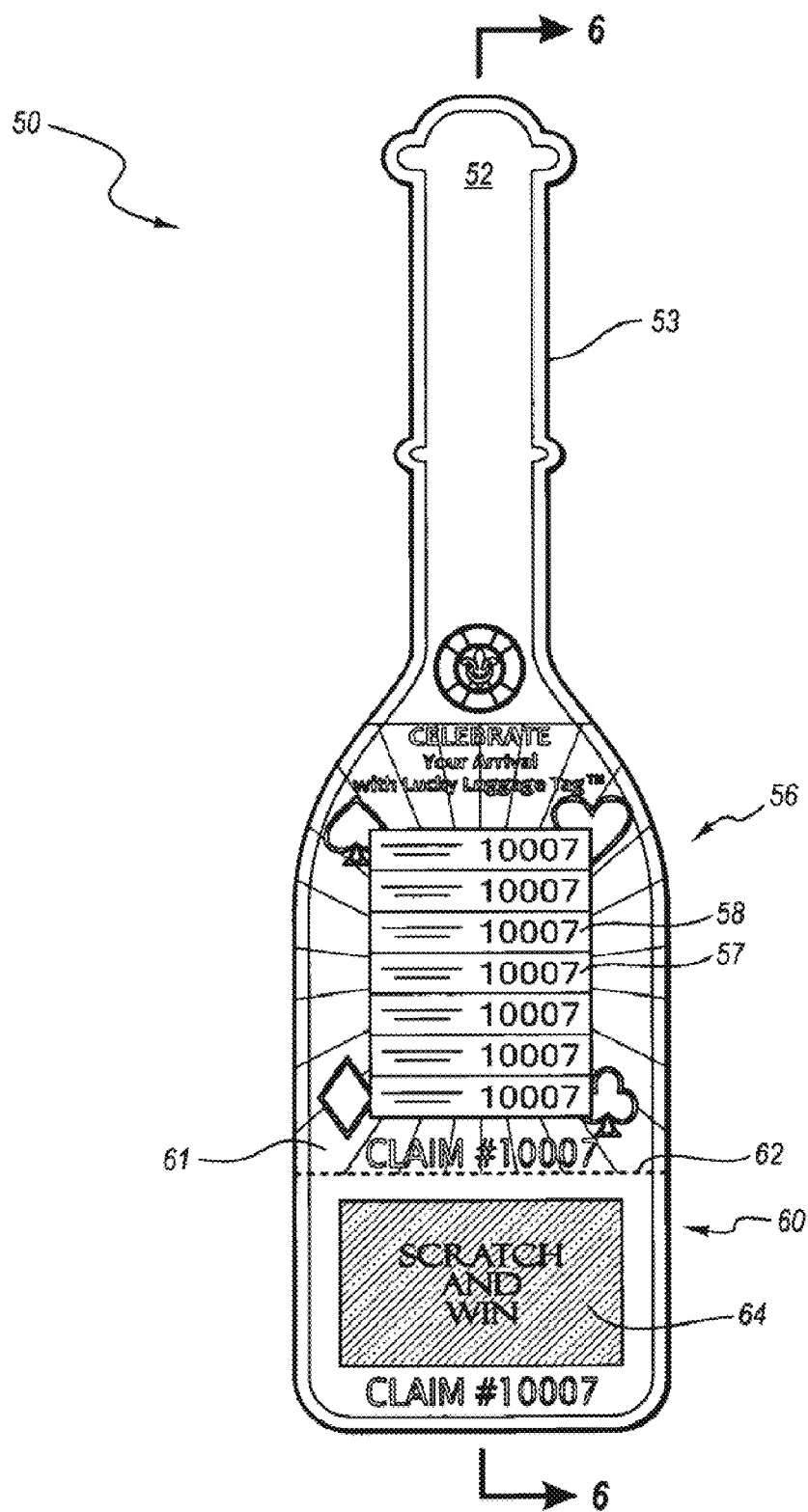
FIG. 3 depicts a first side of a further example of a luggage tag system having a scratch surface.
Figure 4:
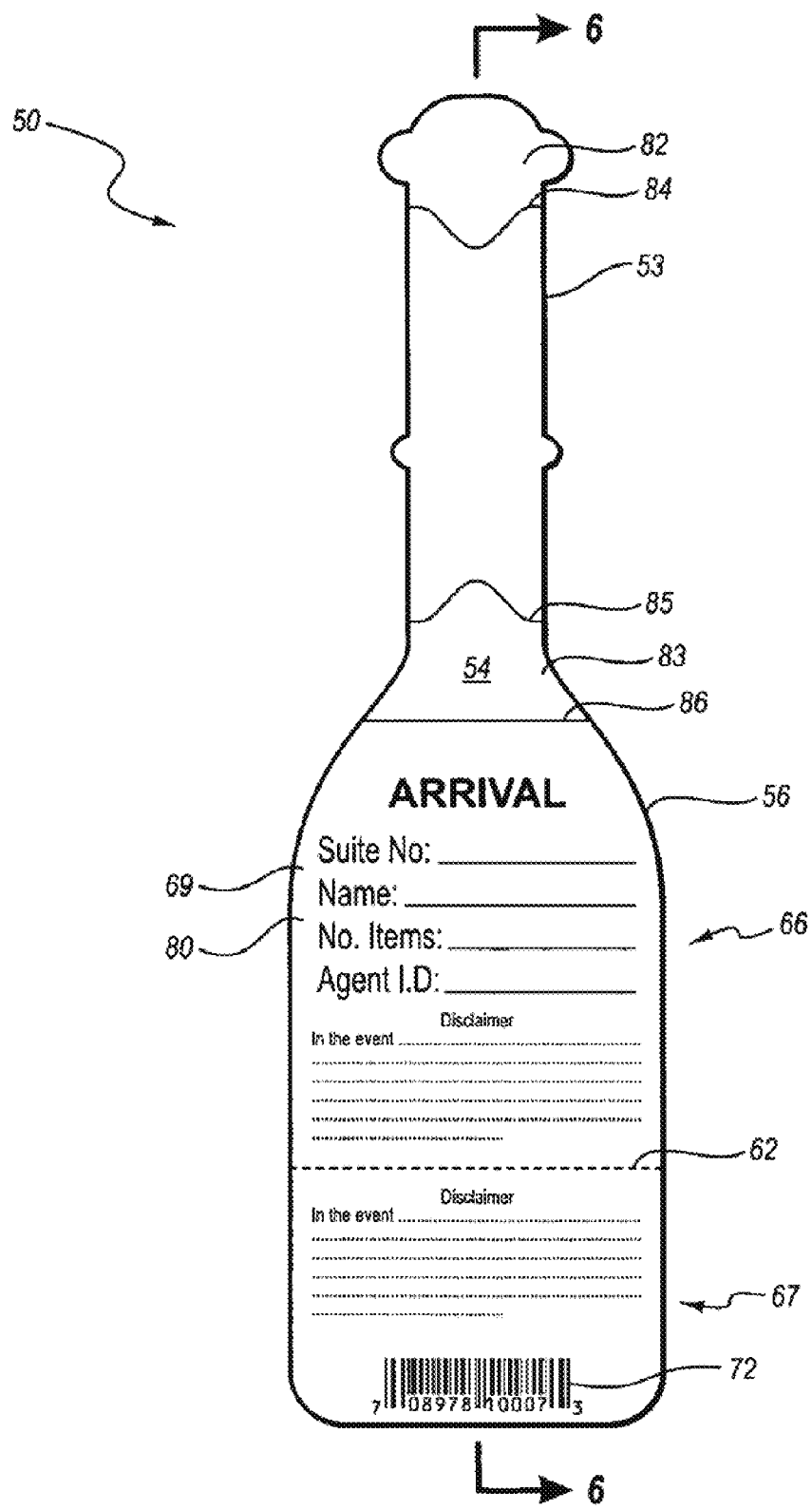
FIG. 4 depicts a second side of the example disclosed in FIG. 3 having a portion for providing luggage ownership information thereon.

Referring now to FIGS. 3 and 4, a further example is disclosed. Specifically, a luggage tag 50 includes a substrate 53 having a first surface 52 and a second surface 54. Generally speaking, the first surface 52 comprises a front side of the substrate 53 while the second surface 54 comprises a back or opposite side of the substrate 53. The substrate 53 of the luggage tag 50 can be constructed using any suitable material, such as, for example, plastic, paper, vinyl or cardboard, or a combination thereof.

Referring particularly to FIG. 3, the first surface 52 includes a first portion 56 and a second portion 60. The first portion 56 and the second portion 60 are separable by a perforated segment 62. The first portion 56 of the first surface 52 includes space for one or more identifying labels 58. Each identifying label 58 preferably includes a unique identifying serial number 57 (e.g., "10007" as illustrated) and, if desired, a corresponding barcode (not illustrated) for identifying purposes. Alternatively, each identifying label may include simply a bar code. The identifying labels 58 are preferably kiss-cut and removably attached to the first surface 52. The unique identifying serial number 57 is, preferably, also printed elsewhere on the first surface 52 at a location—e.g., location "61"—where it does not interfere with the identifying labels 58. The first portion 56 also includes space for a scratch surface 64. The scratch surface 64 covers information printed underneath thereof on the first surface 56 concerning a promotional advertisement or solicitation, and serves to keep the information hidden prior to the scratch surface being scratched away by a user's fingernail or coin or the like.

Referring to FIG. 4, the second surface 54 includes a first portion 66 and a second portion 67. The first portion 66 and the second portion 67 are separable by a perforated segment, preferably the same perforated segment 62 referred to above. The first portion 66 of the second surface 54 includes space for printing various identifying information including, for example, ownership identifying information 80. The ownership identifying information 80 includes generally the owner's name, the number of pieces of luggage and any additional information that is helpful in tracking or delivering the luggage—e.g., the room number of the owner while a guest at a hotel or casino. The ownership identifying information 80 is printed at a suitable location—e.g., location "69"—on the first portion 66 of the second surface 54. The first portion 66 of the second surface 54 further includes space for printing additional information—e.g., a disclaimer—relating to the promotional advertisement appearing under the scratch surface 64 located on the second portion 60 of the first surface 52 of the luggage tag 50. The same additional information may, if desired, be printed on the second portion 67 of the second surface 54. The unique identifying serial number 57 and, if desired, a corresponding barcode 72, is also be printed on the second portion 67 of the second surface 54 for further identifying purposes. Preferably, the first portion 66 and the second portion 67 of the second surface 54 are separable using the perforated segment 62—i.e., the same perforated segment used to separate the first portion 56 and the second portion 60 of the first surface 52.

Referring now to FIGS. 5 and 6, further details of an example similar to that just discussed are disclosed. Referring to FIG. 5, for example, the flat substrate 53 is constructed from a substrate stock having, in cross section, a first layer 91 and a second layer 92. The first layer 91 includes a vinyl sheet having an adhesive underside 94 and a topside 95 suitable for lithographic printing. The second layer 92 includes a vinyl sheet having an adhesive receiving underside 96 and a topside 97 suitable for lithographic printing. Referring also to FIGS. 3 and 4, the first surface 52 of the flat substrate 53 corresponds to the topside 95 of the first layer 91 and the second surface 54 of the flat substrate 53 corresponds to the topside 97 of the second layer 92. A suitable dual-layer flexible vinyl substrate as described herein and above may be purchased from Fasson™. The substrate may be purchased on either rolls or sheets suitable for use with lithographic processing techniques.

Referring now to FIGS. 5 and 6 and to FIGS. 3 and 4 where appropriate, the first layer 91 includes the first portion 56 and the second portion 60 of the first surface 52. The topside 95 of the first layer 91 includes a suitable space at the first portion 56—e.g., location "61"—for printing the unique identifying serial number 57 (e.g., "10007" as illustrated). The first layer 91 further includes one or more identifying labels 58. The identifying labels 58 each include the unique identifying serial number 57 or bar code (not illustrated) printed on the topside 95. The identifying labels 58 are preferably sectioned by kiss-cuts 90 extending through the first layer 91 and removably attached to the second layer 92 by the adhesive underside 94 of the first layer 91. The first portion 56 and the second portion 60 of the first layer 91 are separable through the perforation segment 62. The scratch surface 64 is provided on the topside 95 of the first layer 91 at a suitable space at the second portion 60. The unique identifying serial number 57 is, preferably, also printed on the on the topside 95 of the first layer 91 at the second portion 60 in an area not obscured by the scratch surface 64. In one example, the scratch surface 64 comprises a grey ultraviolet layer that may be applied using standard techniques know to those having skill in the art. In a further example, the scratch surface 64 comprises a grey ultraviolet layer 64A applied on top of a previously applied clear ultraviolet layer 64B. The clear ultraviolet layer 64B serves to protect the promotional advertisement, solicitation or other printed information from being scratched away during the process of removing the scratch surface 64 by a user's fingernail or coin or the like.

Referring still to FIGS. 3-6, the second layer 92 includes the first portion 66 and the second portion 67 of the second surface 54. The topside 97 of the second layer 92 includes a suitable space at the first portion 66—e.g., location "69"—for printing the ownership identifying information 80 and the disclaimer relating to the promotional advertisement appearing under the scratch surface 64. The first portion 66 and the second portion 67 of the second layer 92 are separable through the perforation segment 62. The topside 97 of the second layer 92 at the second portion 67 includes space for printing additional information—e.g., the disclaimer referred to above—and, in addition, the unique identifying serial number 57. If desired, a barcode 72 corresponding to the unique identifying serial number 57 is also printed on the topside 97 of the second layer 92 at the second portion 67 for identifying purposes. The second layer 92 further includes first 82 and second 83 removable portions that are defined and sectioned by first 84, second 85 and third 86 kiss-cut segments extending through the layer. The first 82 and second 83 removable portions are removed from the second layer 92 thereby exposing corresponding portions of the adhesive underside 94 of the first layer 91 that can be secured to one another so as to form a loop securable about a luggage handle or the like.

Figure 7:
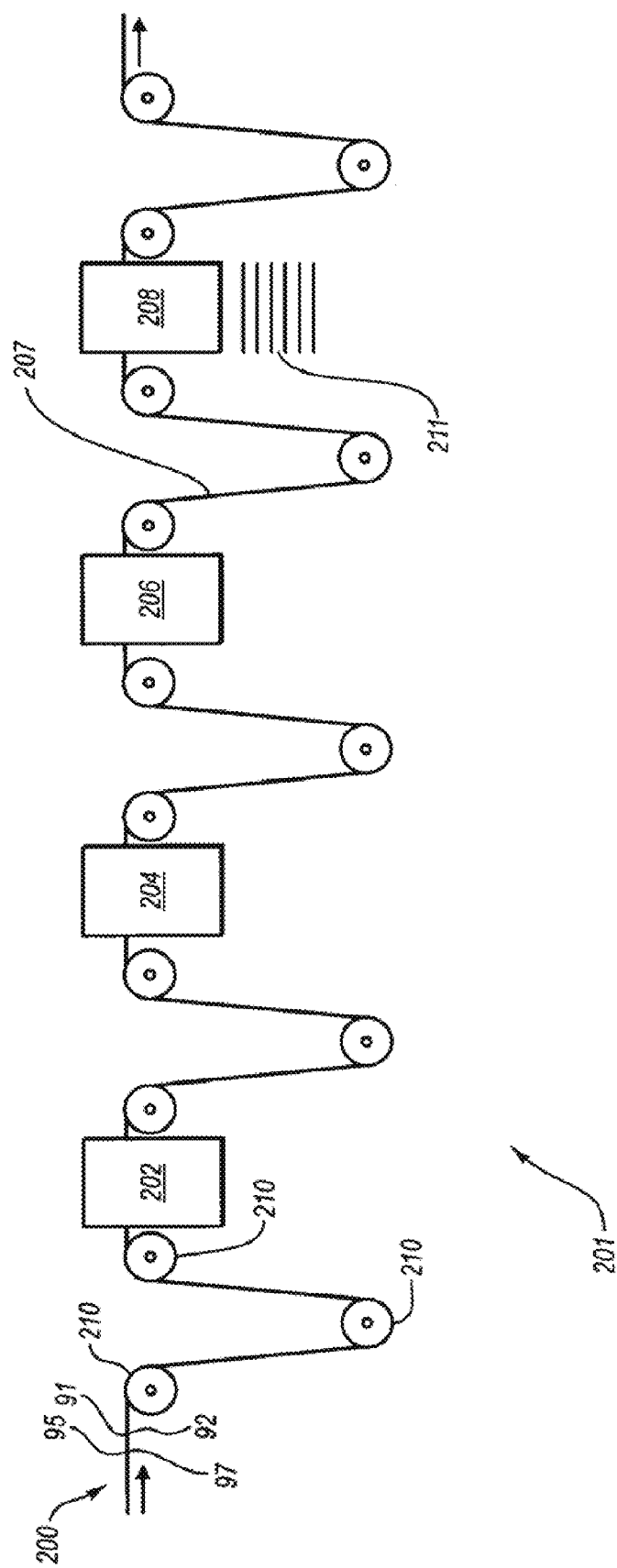
FIG. 7 depicts a cross sectional view of an apparatus for preparing one example of the luggage tags from pre-prepared stock.

Referring now to FIG. 7, one example of a process for applying the scratch surface 64 and performing the kiss-cutting and additional cutting operations to a substrate is disclosed. Specifically, a continuous feed of flexible vinyl substrate 200 similar to the two-layer substrate described above is fed to a processing apparatus 201. The processing apparatus 201 comprises a clear ultraviolet coating applicator 202, a grey ultraviolet coating applicator 204, a kiss-cutting device 206 and a die cutting device 208. In one example, the flexible vinyl substrate 200 has previously undergone lithographic processing and has imprinted thereon a series of luggage tags having one or more of the various segments of printed information described above applied to the topside 95 of the first layer 91 and the topside 97 of the second layer 92. The substrate 200 then passes through the clear ultraviolet coating applicator 202 where a clear ultraviolet coating 64B is applied to a suitable space of the second portion 60 as described and illustrated above—see, e.g., FIGS. 3 and 6. Following application of the clear ultraviolet layer 64B, the substrate 200 then passes through the grey ultraviolet coating applicator 204 where a grey ultraviolet coating 64A is applied to the suitable space of the second portion 60 as described and illustrated above. In an alternative example, only one applicator is employed to apply only the grey ultraviolet coating.

Following application of the grey ultraviolet coating or both the clear and grey ultraviolet coatings, the substrate 200 then passes through the kiss-cutting device 206, where both layers of the substrate 200 are kiss-cut in the positions indicated in, for example, FIG. 6, including the perforated segment 62. The kiss-cutting operation leaves the substrate 200 and the layers 91, 92 comprising the substrate still intact. At this point, the kiss-cut substrate 207 passes through a die-cutting device 208. The die-cutting device 208 is configured to cut through both layers 91, 92 of the substrate 200 in a pattern that yields the final luggage tag 50 product, as illustrated, for example, in FIGS. 3 and 4. As the substrate passes through the die-cutting apparatus 208 and is die-cut, the cut luggage tags 50 are collectably received in a manner known by those having skill in the art—e.g., in a stack 211 adjacent the die-cutting device 208. The remainder of the substrate 200 is then passed to a collecting device—e.g., a roll (not illustrated)—where the remainder is collected for disposal.

Those having skill in the art will appreciate that the above described process may occur in "single row-series," where a single row of luggage tags 50 is imprinted on the substrate 200 and processed with the ultraviolet layer(s), kiss-cut and then die-cut, or in "parallel row-series," where parallel rows of luggage tags 50 are imprinted on the substrate 200 processed with the ultraviolet layer(s), kiss-cut and then die-cut.

Figure 8:
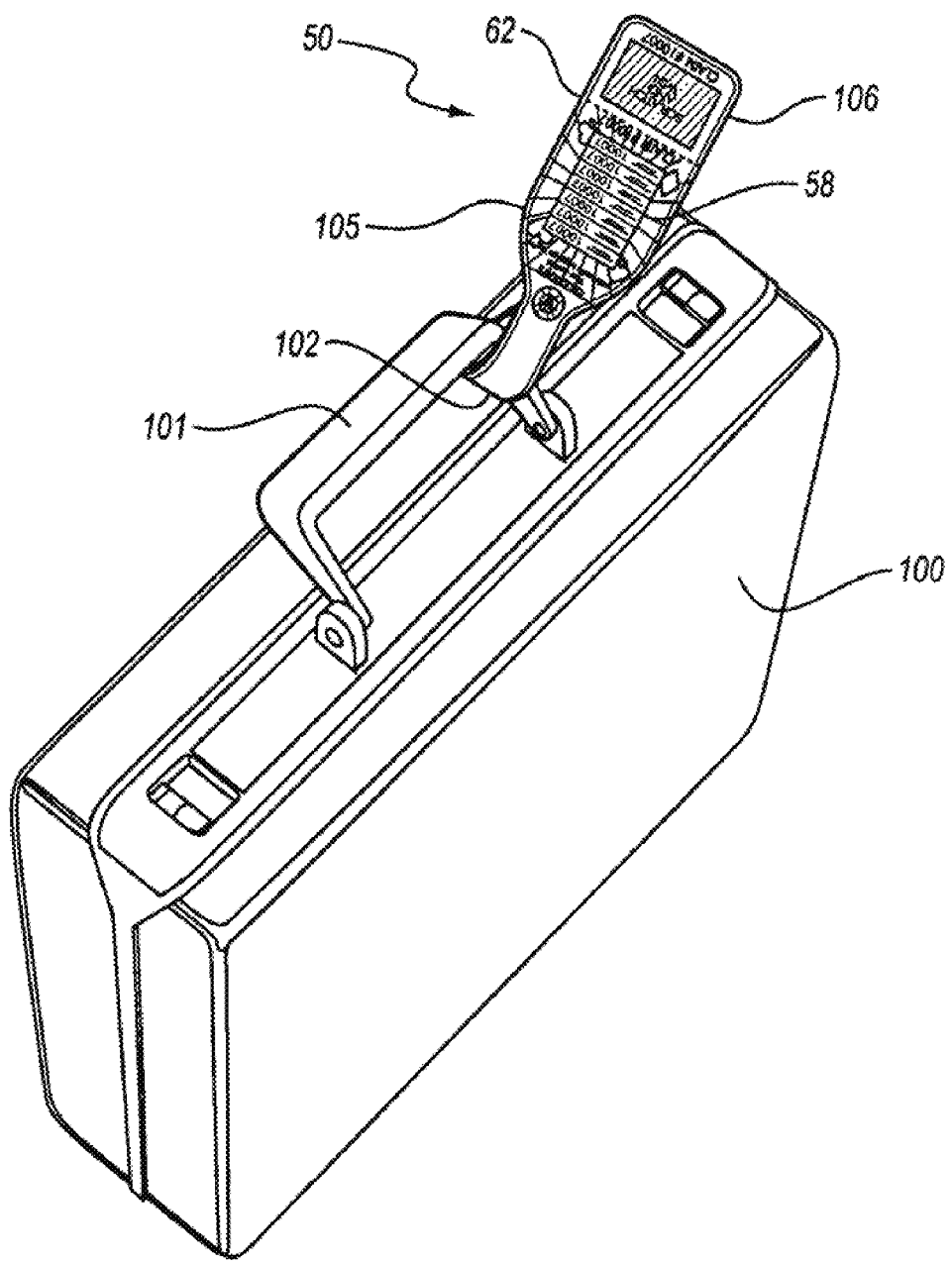
FIG. 8 depicts a perspective view of the example disclosed in FIGS. 3 and 4 shown attached to a luggage case.

In one example of use, a method for identifying ownership of luggage and providing a promotional advertisement is disclosed. Referring, for example, to FIGS. 3, 4 and 8, upon arrival by a guest at a hotel or casino, a luggage tag 50 is obtained by a hotel or casino employee. Information concerning the name of the guest and the number of pieces of luggage is noted on the second portion 67 of the second surface 54 of the luggage tag 50, along with the room number or cell phone number or other pertinent identifying information of the guest or the identification number of the employee. The first 82 and second 83 removable portions are removed from the second layer 92 thereby exposing corresponding portions of the adhesive underside 94 of the first layer 91. Referring now to FIG. 7, the luggage tag 50 is then looped through a handle 101 or strap of a luggage piece 100 followed by the now exposed corresponding portions of the adhesive underside 94 being secured to one another, thereby forming a loop 102 preventing removal of the luggage tag 50 from the luggage piece 100. Luggage identifying labels 58 are then detached from the first layer 91 of the luggage tag 50 and secured using the adhesive underside 94 to the handles or other suitable locations of any other individual pieces of luggage. Each piece of luggage is thus uniquely identified for transport to the guest's room by a bellhop or other hotel or casino employee.

Following the securing of the luggage tag 50 and labels 58 to the guest's luggage pieces, the luggage tag 50 is separated into a first tag portion 105 and a second tag portion 106 by tearing the perforation segment 62 that extends through both the first 91 and second 92 layers of the luggage tag 50. The first tag portion 105 remains secured to the luggage piece 100 while the second tag portion 106 is handed to the owner of the luggage piece 100. The owner may then, at his or her convenience, remove the scratch surface 64, thereby revealing a prize—e.g., a ticket or tickets to a show or dinner at a restaurant—or other promotional item.

Figure 9:
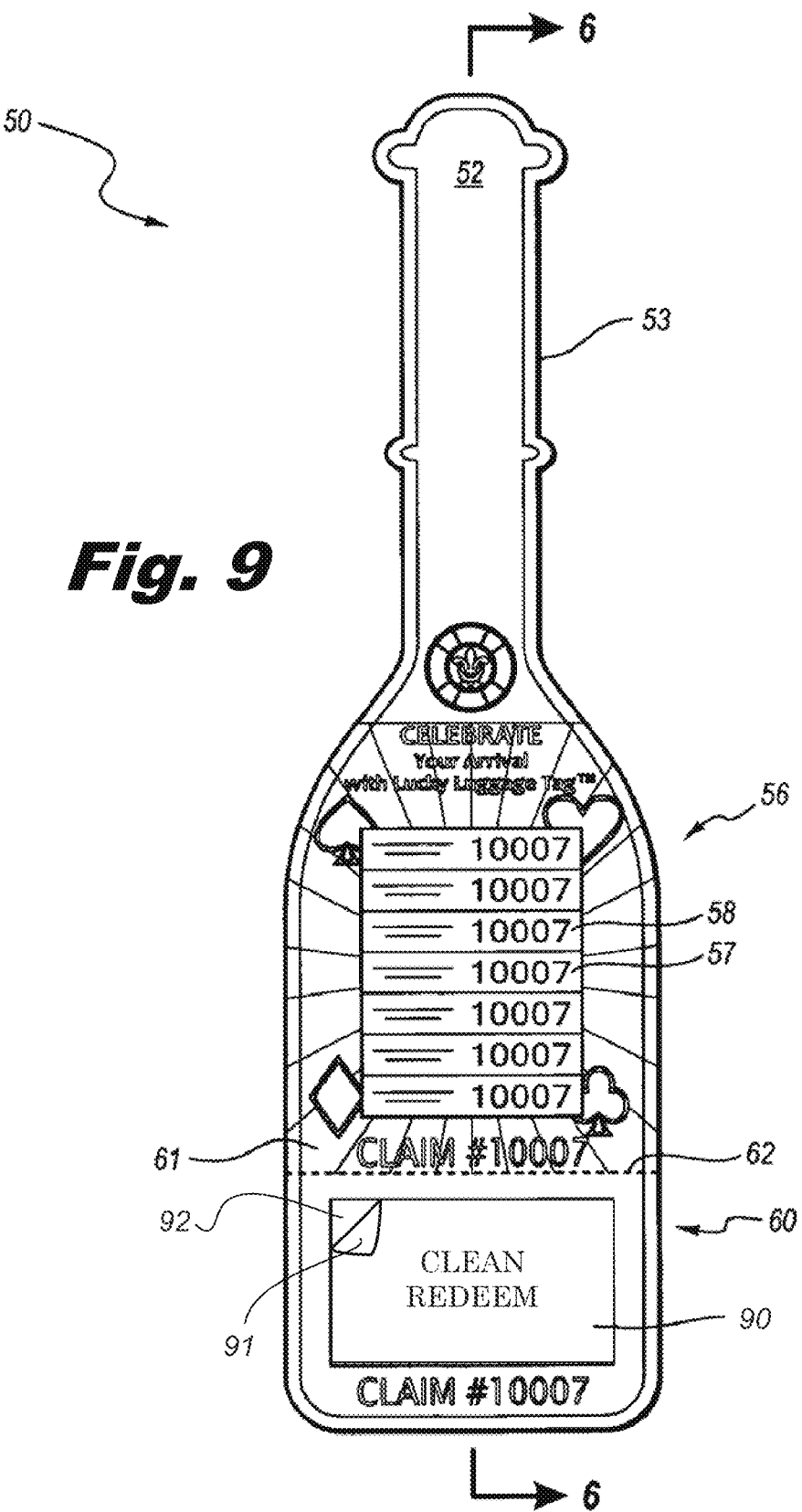
FIG. 9 depicts another luggage tag system according to a further example of the principles disclosed herein.

FIG. 9 depicts another luggage tag system according to a further example of the principles disclosed herein. As shown in FIG. 9, the luggage tag 50 is similar to the examples described above. A unique serial number 57 is replicated on both a first portion 56 and a second or removable portion 60 of the tag 50.

The removable portion 60 may also include a bar code 72 (FIG. 4) that encodes the unique serial number 57 for the tag 50. This bar code may be placed on either the front or rear surface of the removable portion 60 of the tag. The first portion 56 may also include a copy of the bar code.

The removable portion 60 also includes a coupon or prize identifier 92. In some examples, this feature 92 of the removable portion 60 is a coupon that can be redeemed for a reduced price or other deal for goods or services. These goods or services may be provided by the same facility issuing the luggage tag 50 to a patron or by an affiliated business or enterprise that wishes to advertise to the patrons of the facility issuing the tag 50. In other examples, this feature 92 of the removable portion 60 simply identifies a prize that will be awarded to the recipient of the tag when appropriately presented to the facility issuing the tag 50 or an affiliated business or enterprise that is offering the prize.

In either case, the feature 92 can be a graphic or picture, with or without accompanying text, that illustrates the prize or goods or services being offered. The graphic or picture may be in color. In other examples, the feature 92 may contain only text naming or describing the prize or goods or services being offered.

In previous examples, this feature 92 is covered by a scratch-off material that is opaque and must be removed before the feature 92 becomes visible. In the example of FIG. 9, by contrast, the feature 92 is initially covered and obscured by an opaque adhesive panel 90. The panel may have a label printed on the outward surface. In the example of FIG. 9, this label bears the words "CLEAN REDEEM."

As shown in FIG. 9, the panel 90 is removed by, for example, turning down a corner 91 of the panel and pealing the panel 90 off of the removable portion 60 of the luggage tag 50. Once the panel 90 is removed, the feature 92 representing the coupon or prize identifier is revealed to the patron.

The adhesive panel 90 is made so that, once it is separated in any amount from the tag 50, the portion of the panel 90 pealed away from the luggage tag 50 loses its adhesive quality and will no longer adhere to the removable portion 60 of the luggage tag 50. This may be accomplished, for example, with a static electric charge that is part of the adhesive system securing the panel 90 to the removable portion 60. Once the panel 90 is separated in any degree, the charge is dissipated, and the panel 90 loses its ability to adhere to the tag 50.

This prevents anyone from secretly tampering with, or revealing, the coupon or prize identifier 92 prior to the tag 50 being received by a legitimate patron of the facility issuing the tag and the panel 90 being removed by that patron as intended. If any such premature, unauthorized use occurs, it will be evident from the panel's lack of adhesion to the tag. This control of the process will be further described with respect to FIGS. 10 and 11.

In some examples, the base construction of the material used for the adhesive panel 90 is a 0.75 mil clear film that has a solid coat of permanent adhesive on one side. Laminated to the top side of that film is another 0.75 mil clear film. The top layer of film is a pattern coat of special adhesive that allows the two ply's of film to separate. The resulting 1.5 mil film construction is laminated to a 40 lb. silicone coated liner.

After the printing process, on that construction, the film is laminated with a 0.95 mil polypropylene clear laminating film that is coated with permanent adhesive. The total construction of the finished product is 2.45 mils thick.

The printing process is Flexo utilizing ultra-violet inks and photopolymer plates. The adhesive panel 90 is printed using three print decks on the press. As the base 2 mil web travels through the press the first print deck prints a specific sized solid block of PMS 87 Silver Scratch OFF UV ink. The second print deck applies another hit of the same size block with the same ink as the first pass printed. This is done for the opacity needed for the adhesive panel 90. In the third print deck, the black copy is printed. The 2 mil web, printed with the two colors using three plates, is then laminated with the 1 mil clear polypropylene film. The print on the label is now sandwiched between two layers of film. The finished printed and laminated construction is then die cut to a rectangular shape.

The finished adhesive panel 90 is then applied over the picture or prize indicator on the front of the Lucky Luggage Tag 50 on removable portion 60. When the tag 50 is used the adhesive panel 90 can be easily peeled away and removed from the removable portion 60 of the tag 50. Since the opaque silver ink in the adhesive panel 90 has been sandwiched between two layers of film, as described above, there is not the mess of the ink usually associated with scratch off tickets.

Figure 10:
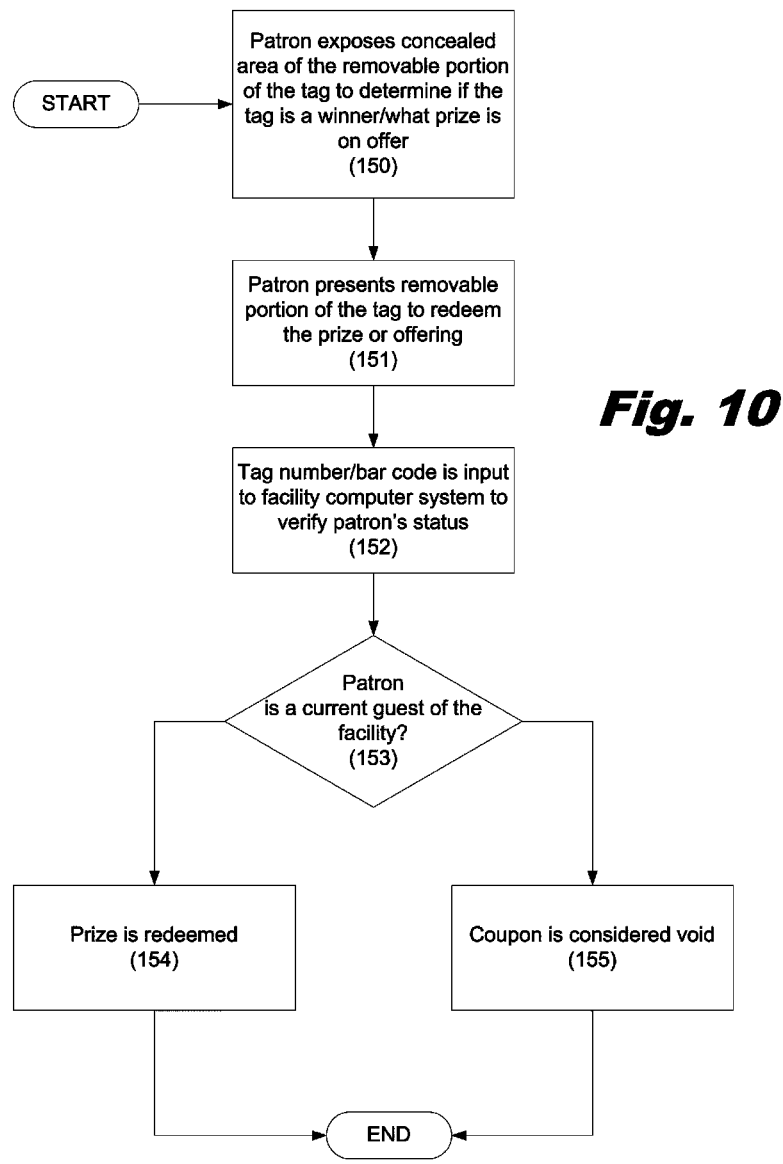
FIG. 10 is a flowchart depicting a process for redeeming a prize or coupon obtained from a luggage tag system according to principles disclosed herein.

FIG. 10 is a flowchart depicting a process for redeeming a prize or coupon obtained from a luggage tag system according to principles disclosed herein. As shown in FIG. 10, the method begins when a luggage tag, such as that described above in connection with FIG. 9, is issued to a patron. This is typically done to identify that patron's luggage and baggage as it is moved from the point of entry to the patron's room or suite. At this point, referring to FIG. 9, the patron may detach the removable portion 60 of the tag 50 so that the patron has a record of the unique serial number 57 being used to identify his or her luggage.

The patron may also want to see what coupon or prize he or she has received as the recipient of that particular luggage tag 50. Consequently, the patron then removes the panel 90 from the tag 50. If the panel 90 has been tampered with or removed previously, this will be evident from the lack of adhesion between the panel 90 and the tag.

Returning to FIG. 10, the patron exposes 150 the concealed area of the removable portion 60 of the tag 50 by removing the panel 90. In some examples, only a fraction of the luggage tags used will provide a prize or coupon to the recipient patron. In other examples, every tag 50 used by the facility may provide a prize or coupon to the recipient patron.

Next, the patron presents (151) the removable portion 60 of the tag 50 to either the facility that issued the tag 50 or an affiliated business to redeem the prize or coupon on offer.

As a means of controlling whether the tag 50 has been legitimately received by a patron of the facility issuing the tag, the status of the patron is confirmed. When the luggage tags 50 are first provided to patrons, for example, when the patron is checking into the facility, such as a hotel, casino, cruise ship, etc., the unique serial number 57 is entered into the facilities electronic guest records in association with the patron's record as a guest of the facility.

At the time that the coupon or prize identifier of the removable portion 60 is being redeemed, the unique serial number 57 from the removable portion of the tag is entered (152) into the facility's computer system by personnel assisting the patron with redemption of the coupon or prize identifier. This may be done by entering the unique serial number 57 into the computer system by means of a keyboard or by scanning a barcode on the removable portion 60 of the tag 50 with a barcode reader.

The computer system then checks the number to see if that unique serial number is, in fact, associated with a record for a current guest of the facility. If this is the case, as determined in block 153 of FIG. 10, the patron is given the benefit of the coupon or awarded the indicated prize 154.

If the person presenting the coupon or prize identifier is not a current patron of the facility, then the coupon or prize identifier is considered void 155. In this case, the facility may wish to investigate whether someone is attempting to fraudulently redeem the prize indicator or coupon contrary to the rules under which the luggage tags 50 are distributed.

Figure 11:
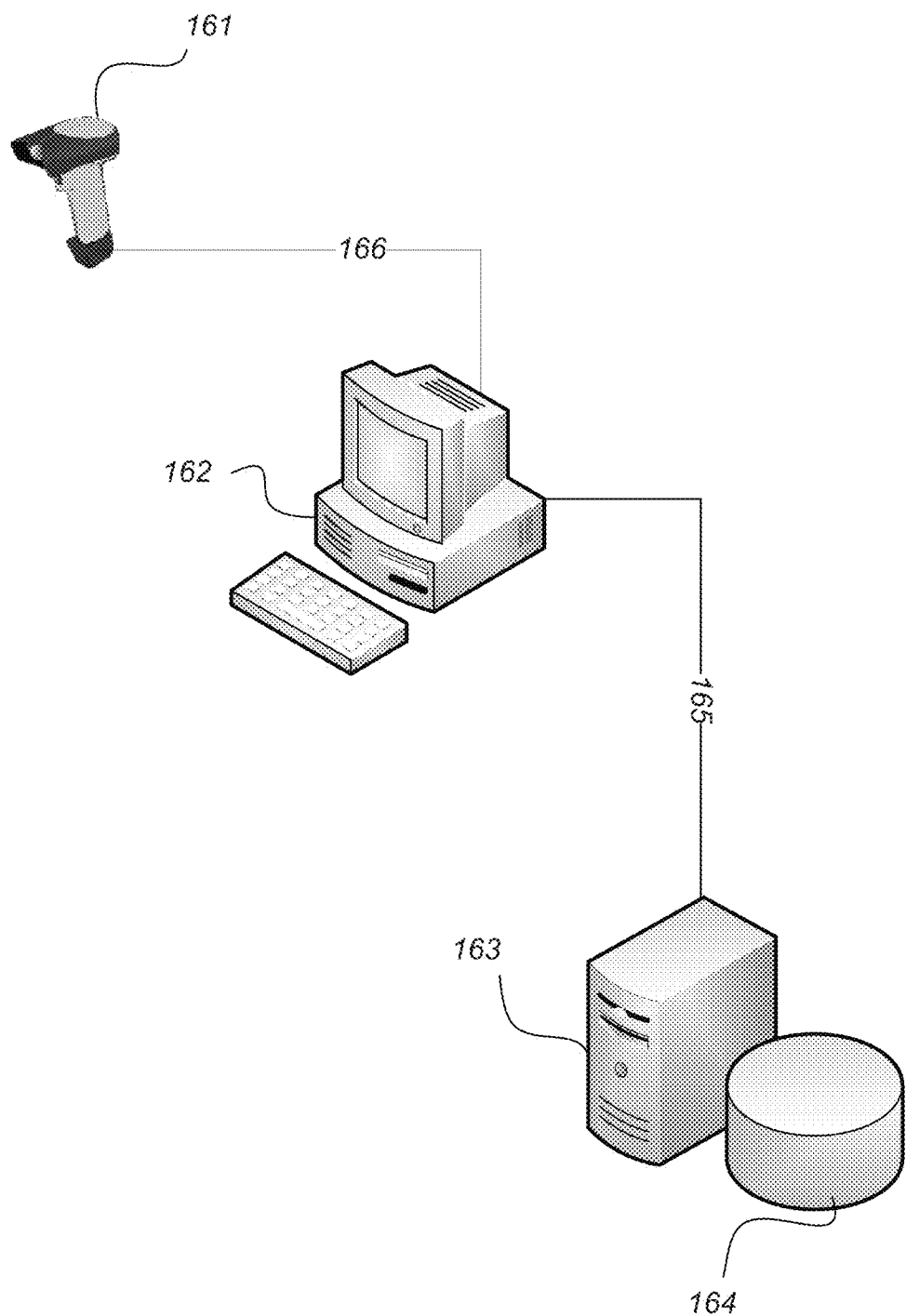
FIG. 11 depicts a system for performing the method illustrated in FIG. 10.

FIG. 11 depicts a system for performing the method illustrated in FIG. 10. As shown in FIG. 11, a barcode reader 161 can be used to capture the unique serial number from a removable portion 60 of a luggage tag, as described herein, that is being presented to redeem the coupon or to receive the prize indicated. The data from the reader 161 is transmitted by the reader to a computer terminal 162. The connection 166 between the reader 161 and the computer terminal 162 may be wired or wireless. Alternatively, the unique serial number may be input directly to the computer terminal 162 using a keyboard, keypad, touch screen or other data entry device.

The computer terminal 162 may be operated by the same facility that issued the luggage tag 50 or an affiliated business entity that is offering prizes, goods or services to recipients of the luggage tags 50 from the main facility. In any event, the computer terminal 162 contacts a server 163 supporting a database 164. In some examples, the database 164 may be located on the computer terminal 162 itself. The connection 165 between the terminal 162 and the server 163 may include a Local Area Network or a larger network, such as the Internet.

The database 164 identifies all current guests or patrons of the facility that issues the luggage tags 50. The database 164 also associates the unique serial number of a luggage tag 50 with the record of the patron to whom that tag was issued. As described above with regard to FIG. 10, if the unique serial number is not associated with a current guest record, the coupon or prize indicator may be held invalid. The computer terminal 162 will display whether the unique serial number entered or captured corresponds to a current guest record so that personnel assisting customers can respond accordingly.

In some examples, the guest may be given a limited amount of time after checking out of the facility that issued the tag 50 to still redeem the coupon or collect the prize indicated. The enterprise redeeming the coupon or prize indicator may further require the person having the removable portion 60 of the tag 50 to present identification verifying that they are the guest to whom the luggage tag 50 with the corresponding unique serial number was issued.

The preceding description has been presented only to illustrate and describe examples and examples of the principles described. This description is not intended to be exhaustive or to limit these principles to any precise form disclosed. Many modifications and variations are possible in light of the above teaching.

What is claimed is:

1. A luggage tag system comprising:
    a main portion comprising an elongated portion for forming a loop to attach said luggage tag system to a piece of luggage;
    a removable portion detachable from said main portion;
    a unique serial number provided on both said main portion and said removable portion;
    a number of identifying labels removably attached to said main portion, wherein said identifying labels comprise a unique serial number;
    an area of said removable portion comprising the feature printed on said removable portion and describing a prize or coupon; and
    an adhesive panel covering said feature to prevent said feature from being seen until said adhesive panel is removed;
    wherein any portion of said adhesive panel that is separated from said removable portion of said tag system loses its ability to adhere to said removable portion so that premature removal of said adhesive panel, in whole or in part, is detectable.

2. The luggage tag system of claim 1, wherein said adhesive panel is adhered to said removable portion of said tag, at least in part, by a static electric charge that is dissipated when said adhesive panel is separated from said removable portion of said tag.

3. The luggage tag system of claim 1, wherein said feature includes a graphic.

4. The luggage tag system of claim 3, wherein said graphic is a color graphic.

5. The luggage tag system of claim 1, wherein said removable portion comprises a barcode that encodes said unique serial number.

6. The luggage tag system of claim 1, wherein said removable portion is separated by perforation from said main portion.

7. The luggage tag system of claim 1, wherein said premature removal of said adhesive panel is detectable based on a portion of said adhesive panel that no longer adheres to said tag system prior to said tag system being given to an intended recipient.

8. The luggage tag system of claim 1, wherein said unique serial number on said removable portion of said luggage tag system corresponds with a current guest cord of a facility that issues said luggage tag systems.

9. The luggage tag system of claim 1, wherein said feature on said removable portion of said luggage tag is valid if said unique serial number is associated with a current guest record of a facility that issues such luggage tag systems.

10. The luggage tag system of claim 1, wherein said feature on said removable portion of said luggage tag is void if said unique serial number is not associated with a current guest record.

11. The luggage tag system of claim 1, wherein said loop being formed in part by multiple exposed portions of an adhesive underside secured to one another.

12. The luggage tag system of claim 1 wherein said adhesive panel comprises an outward surface that includes a printed label.

13. The luggage tag system of claim 1, wherein adhesive panel comprises opaque silver ink sandwiched between two layers of film.

14. The luggage tag system of claim 1, wherein said identifying labels are kiss-cut.

* * * * *